United States Patent [19]

Senni et al.

[11] Patent Number: 4,791,265

[45] Date of Patent: Dec. 13, 1988

[54] METHODS AND APPARATUS FOR ELECTRIC RESISTANCE WELDING

[75] Inventors: Alfred R. Senni, Burlington; Louis F. Grama, Robbinsville, both of N.J.

[73] Assignee: Fifth Dimension Inc., Trenton, N.J.

[21] Appl. No.: 890,297

[22] Filed: Jul. 29, 1986

[51] Int. Cl.$^4$ .............................................. B23K 11/00
[52] U.S. Cl. ................... 219/91.2; 219/56.21; 219/56.22; 219/86.23; 219/86.33
[58] Field of Search ................ 219/86.1, 86.23, 86.25, 219/86.33, 86.41, 86.7, 91.2, 95, 96, 86.51, 86.61, 56, 56.21, 56.22, 57, 58

[56] References Cited

U.S. PATENT DOCUMENTS

| | | | |
|---|---|---|---|
| 3,045,103 | 7/1962 | Warner | 219/86.41 |
| 3,674,976 | 7/1972 | Bitko | 219/86.7 |
| 4,510,370 | 4/1985 | Szantho et al. | 219/86.33 X |
| 4,609,802 | 9/1986 | Sotonyi et al. | 219/56 |

Primary Examiner—Clifford C. Shaw
Attorney, Agent, or Firm—Burns, Doane, Swecker & Matihis

[57] ABSTRACT

An electric resistance welder comprises a frame and a movable arm mounted to the frame for gravitational movement relative thereto. A movable electrode is carried at an end of the movable arm. A stationary electrode is spaced opposite the movable electrode to accommodate a plurality of workpieces therebetween, with the movable electrode resting against the workpieces and gravitationally biased toward the stationary electrode. An electric pulse is conducted through the electrodes and workpieces for heating and softening the workpieces to enable the arm to accelerate toward the stationary electrode at the acceleration of gravity, whereby the movable electrode collapses the workpieces toward one another. A stop is arranged to be engaged by the arm for terminating travel of the arm when the movable electrode has traveled a predetermined distance toward the stationary electrode, and subsequent to termination of the electric pulse. Such a technique is highly suited toward the welding of a ball to a wire, the ball and wire having diameters no greater than 0.04 inches.

7 Claims, 2 Drawing Sheets

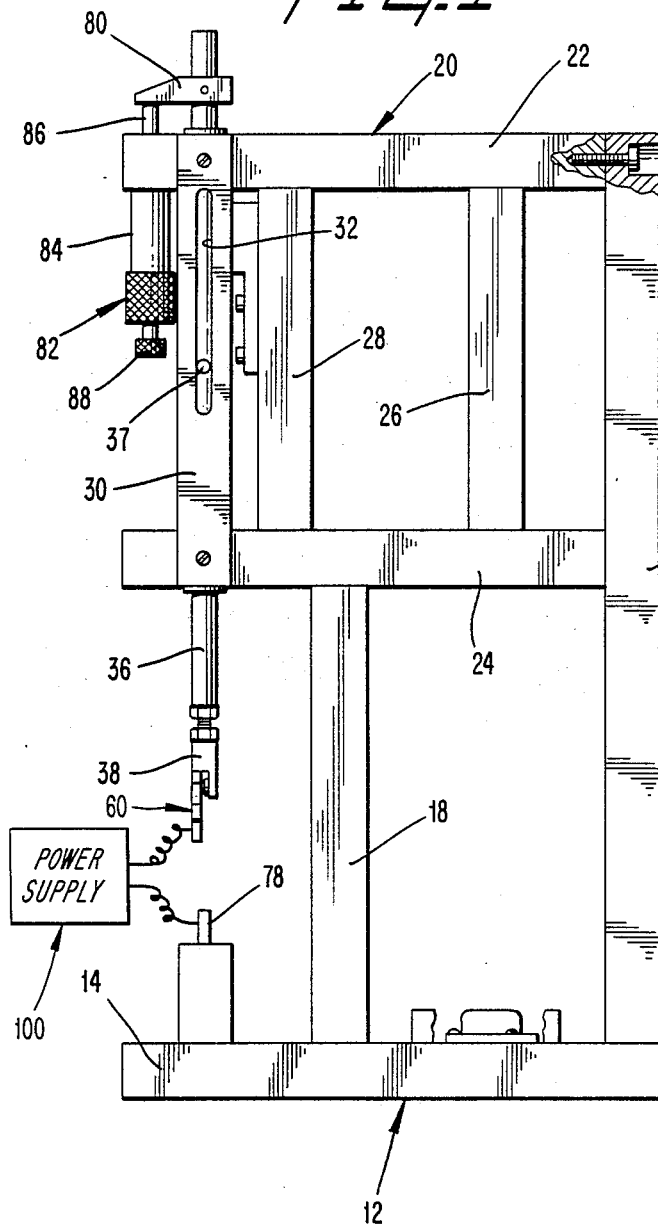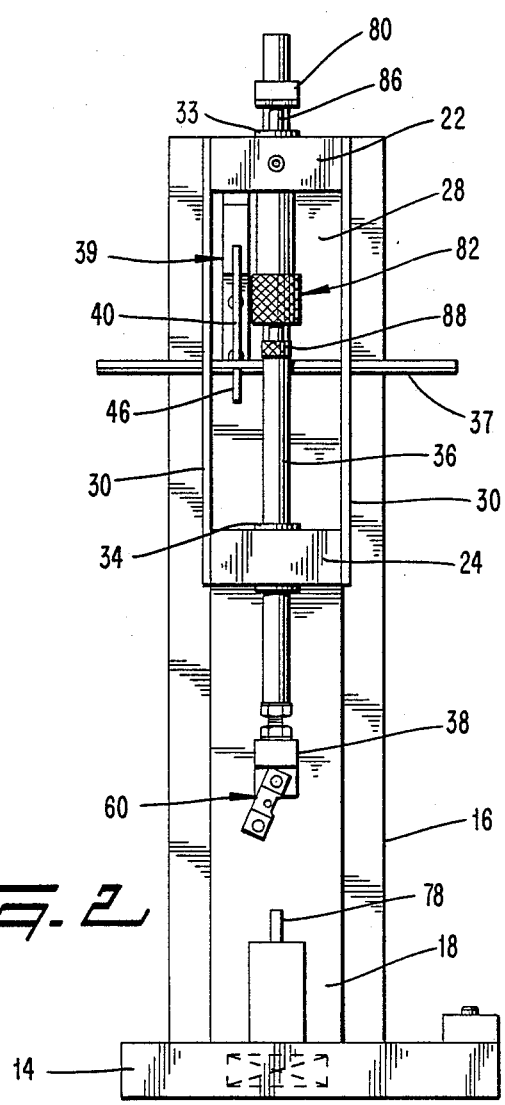

METHODS AND APPARATUS FOR ELECTRIC RESISTANCE WELDING

BACKGROUND AND OBJECTS OF THE INVENTION

The present invention relates to electric resistance welding and, in particular, to methods and apparatus for attaining precision weld depths in electric resistance welding operations.

In electric resistance welding heat is generated in electrically conductive workpieces by conducting a short electric pulse therethrough by means of electrodes situated on opposite sides of the workpieces. One of the electrodes is movable and bears against one of the workpieces under a given pressure to press that workpiece against the other workpiece. In response to being heated, the workpieces are softened to the point where the workpieces are collapsed toward each other (i.e., forged) under the pressure applied by the movable electrode.

It is conventional to apply a welding force to the movable electrode, e.g., by springs, cams or air pistons for example, to push the workpieces together. However, a problem which has long been present in resistance welders involves the occurrence of so-called "spitting" wherein the weld tends to blow apart during the welding operation. Spitting occurs when the material of the workpieces becomes heated above a threshold temperature in the molten state, which overheating is produced by the electric pulse passing through the workpieces. Since the heat build-up generated by the electrical current flow is a function of the magnitude of the electrical resistance of the workpieces, it is desirable to minimize that resistance by imposing a high welding force upon the movable electrode. That is, it is known that the electrical resistance characteristic of the workpieces varies inversely with the force with which the workpieces are pressed together during forging, i.e., the greater the force, the smaller the electrical resistance.

However, even if such measures serve to reduce the electrical resistance to a level which ensures that no spitting occurs due to high electrical resistance of the workpieces, spitting can still occur once the forging action terminates if the electrical pulse continues. Spitting occurs in such a case because once the forging stops, the workpiece is being heated without the heat being dissipated since the collapsing of the workpieces has terminated. The early termination of the forging action results from the rapid rate of forging produced by the high welding force which, as noted above, was employed to minimize the electrical resistance. Therefore, a reduction in welding force to reduce the rate of forging (and hence avoid premature stoppage of the forging action), will only serve to increase the electrical resistance of the workpieces and thereby promote spitting during the forging step. Also, a reduced welding force may not produce a proper collapsing of the workpieces.

One suggestion heretofore made for dealing with the spitting problem involved the use of a rotary driven cam for pressing against the movable electrode. The cam would be arranged to contact and actuate switches for the purpose of initiating the electrical pulse synchronously with the cam rotation, and terminating the electrical pulse immediately prior to the end of cam rotation (i.e., immediately prior to the end of the forging action). However, such a device never achieved commercial success, apparently because the time delays inherent in the behavior of switches made it infeasible to correlate the stoppage of the electrical pulse with the movement of the cam with the requisite high degree of accuracy. Also, such a device did not compensate for dimensional variations of the workpieces. That is, if the cam is positioned to handle workpieces of a given thickness, the presence of a thinner workpiece might result in the cam applying forces to the workpiece only after the electric pulse has been initiated, thereby resulting in spitting. A workpiece thicker than the given thickness might be compressed by the cam prior to the initiation of the pulse, whereupon the workpiece could break.

Consequently, it has been necessary in the use of electrical resistance welders to either endure a limited amount of spitting, or to terminate the electrical pulse sufficiently prematurely to ensure that the pulse will stop before the forging terminates. Such an early cessation of the pulse will result in a rapid hardening of the workpieces, thereby stopping the forging action prematurely; however, such premature termination of the forging action will be acceptable if the range of dimensional tolerances for that particular product is large enough.

On the other hand, there exist certain products for which the range of tolerances is not sufficiently large, and in which no appreciable amount of spitting can be endured. For example, the manufacture of certain slip rings of the type depicted in FIG. 5 herein, involves the welding of iridium balls 1 of 0.010 inch dia. to the ends of a 0.010 inch dia. beryllium copper wire 2, it being required that the spacing d between the balls be precise, e.g., to $\pm 0.002$ inch tolerance. A further requirement is that the distance d cannot be achieved by bending of the wire after the welding is achieved, because the memory or creep of the wire would not permit that distance to be maintained to the required tolerance range. Efforts made by a number of makers of electrical resistance welders to meet those very narrow tolerances have failed.

SUMMARY OF A PREFERRED EMBODIMENT OF THE INVENTION

The present invention involves an electrical resistance welder and method capable of meeting very narrow tolerances because it makes possible the elimination of spitting in electrical resistance operations. The present inventors have determined that an electric resistence welder having a gravitationally movable electrode can be combined with a stop to enable dimensionally precise electrical resistance welding operations to be carried out in the absence of spitting.

The movable electrode is mounted at an end of a freely movable arm, the latter being movable in a frame. A first of the workpieces is mounted in the movable electrode and a second of the workpieces is mounted in a stationary electrode in the frame across from the movable electrode. The movable electrode is manually moved so that the first workpiece rests against the second workpiece. An adjustable stop carried by either the arm or the frame is moved into engagement with an abutment carried by the other of the arm and frame and is then backed off by an amount equal to the desired distance of welding, i.e., the desired distance of workpiece collapse. An electric pulse is conducted through the electrodes and workpieces to soften the latter, whereupon the arm moves freely gravitationally to collapse the workpieces until the stop contacts the abutment once the electric pulse has terminated.

It has been found, quite surprisingly, that a precision weld can be formed in that manner in the absence of spitting. The reason why spitting does not occur appears to relate to the fact that since the movement of the movable electrode is induced by gravity, rather than by mechanical or fluid power, a relatively slow acceleration of the movable electrode occurs and thus a relatively long forging duration. Due to such an extended forging duration, it is feasible to correlate the termination of the pulse relative to the terminaton of the forging action so as to accurately terminate the electric pulse just prior to the end of the forging action. Since the workpieces remain soft for a short instant following termination of the pulse, the gravitationally moving electrode will continue to collapse the workpieces until the arm contacts the stop and thus achieves a dimensionally precise weld. The gravitational nature of the electrode movement assures that the acceleration will not only be relatively slow (i.e., 32.2 ft/sec$^2$), but also will be uniform and constant from one welding operation to the next. Such uniformity could not be achieved in connection with conventional welding techniques involving a power-driven electrode because those electrodes travel too rapidly, and the acceleration is not sufficiently uniform and constant from one operation to the next. The provision of a stop in electrical resistance welders has, in practice, been avoided until now, because, as noted earlier herein, a termination of the forging action prior to termination of the electrical pulse virtually assures that the workpiece will overheat and spit. Hence, manufacturers of electric resistance welders have shunned the use of measures which would obstruct the forging action.

An electrical resistance welder having a gravitationally movable electrode is disclosed in commonly assigned Bitko U.S. Pat. No. 3,674,976 issued July 4, 1972. However, there was no suggestion or realization in that patent that the characteristics of a gravitationally movable electrode would be conducive to the provision of a stop for achieving a dimensionally precise weld without the occurrence of spitting. The arrangement of the stop wherein the stop is not moved into engagement with the abutment until the movable electrode has been moved into contact with the workpiece assures that dimensional variations between successive workpieces will be compensated for.

BRIEF DESCRIPTION OF THE DRAWING

The objects and advantages of the invention will become apparent from the following detailed description of a preferred embodiment thereof in connection with the accompanying drawings in which like numerals designate like elements, and in which:

FIG. 1 is a side elevational view of an electric resistance welder according to the present invention;

FIG. 2 is a front elevational view of the welder depicted in FIG. 1;

DETAILED DESCRIPTION OF A PREFERRED EMBODIMENT OF THE INVENTION

Figure 3:
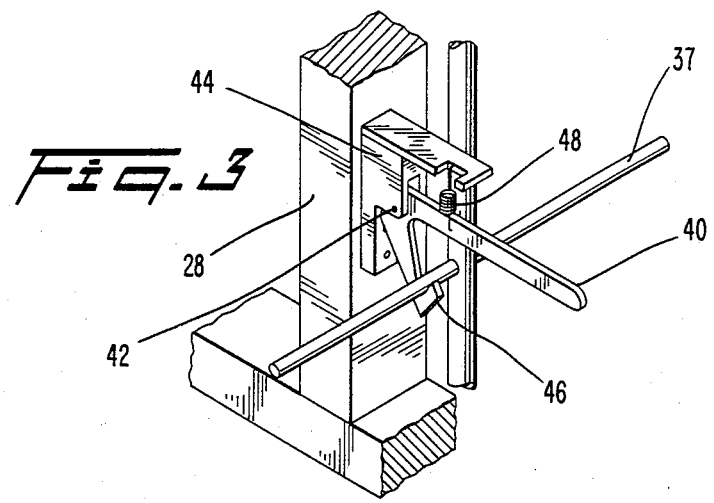
FIG. 3 is a fragmentary perspective view of the welder, with parts removed, to depict a latching mechanism.

An electric resistance welder 10 comprises a main frame 12 which includes a horizontal base 14, an upright back post 16, and an upright front post 18. Mounted on the main frame is a subframe 20 comprising upper and lower horizontal arms 22, 24, respectively, interconnected by upright beams 26, 28. Mounted at front ends of the arms 22 and beams 28 are a pair of upright guide members 30 each of which includes a vertical slot 32.

The upper and lower arms 22, 24 carry aligned slide bearings 33, 34 in which is mounted a vertically slidable arm in the form of a rod-shaped arm 36. The rod 36 carries a horizontal guide bar 37 which is slidable in the slots 32 in order to guide the rod 36 for vertical travel. Mounted at a lower end of the rod is an electrode carrier 38. A latch mechanism 39 is carried by the subframe 20 for releasably retaining the guide bar 37, and thus the rod 36, in an upwardly retracted position. The latch mechanism 39 comprises a hook 40 pivoted at 42 to a bracket 44 carried by the upright beam 28. The hook has a finger 46 which catches the guide bar 37. A spring 48 biases the arm upwardly to retain the bar 37. By pushing downwardly on the hook 40, the bar 37 can be released.

Figure 4:
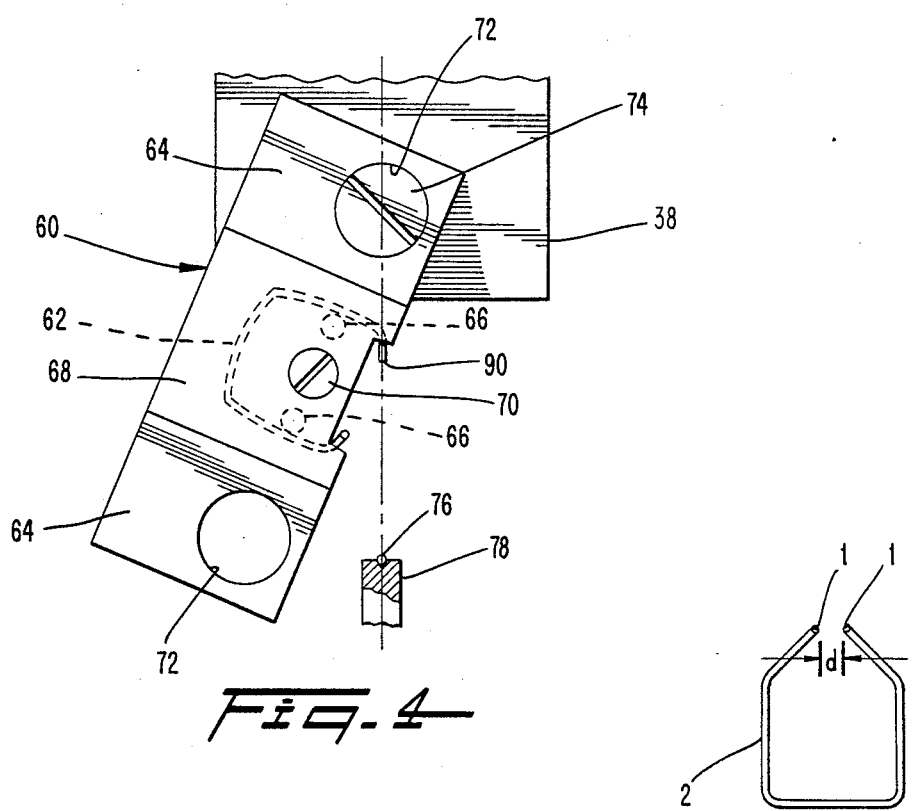
FIG. 4 is an enlarged fragmentary view of the electrodes of the welder with workpieces installed.
Figure 5:
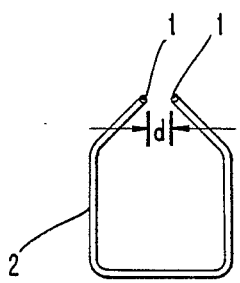
FIG. 5 is a front elevational view of a part formed by the workpieces welded together in accordance with the present invention.

The electrode carrier 38 carries an electrode 60 (FIG. 4) in which one of the workpieces to be welded, preferably the wire 62, is mounted. The electrode includes a base plate 64 which carries a pair of pins 66 around which the wire 62 is placed. A cover plate 68 is positioned over the wire and secured to the base plate by a screw 70 to retain the wire in place with its ends exposed. The base plate 64 includes a pair of holes 72 which enables the base plate to be mounted by a screw 74 to the carrier 38 in either of two orientations whereby the exposed ends of the wire 62 can be selectively aligned with a ball shaped workpiece 76 mounted on a stationary electrode 78, the latter carried by the base 14. Electric current is conducted to the electrodes 60, 78 in any suitable conventional fashion.

It will be appreciated that when the rod 36 is unsupported, it will free-fall gravitationally, accelerating at the acceleration of gravity, i.e., at 32.2 ft/sec.$^2$. Thus, the speed attained by the rod is independent of the weight thereof, as described in greater detail in the aforementioned Bitko U.S. Pat. No. 3,674,976. A welder similar to that described in the foregoing description, wherein the rod free-falls gravitationally along a vertical line, has been commercially employed by the present assignee for at least three years and thus is not novel. That conventional welder has been employed to weld a ball and wire similar to but larger than the ball and wire described herein. In use of such a prior art welder, the electrode is lowered and brought to rest upon the workpieces, and an electric pulse of pre-set duration was applied. The electrode dropped by gravity when the workpieces became soft and stopped in response to rehardening of the workpieces following a termination of the pulse. The falling of the electrode was not obstructed or terminated except by the hardening of the workpieces. Following such a welding operation, the welded products must be subjected to grinding operations in order to meet the dimensional requirements. Such grinding is very inconvenient, time-consuming, and costly. The tolerance range for such product was even larger than that for the smaller ball and wire product described herein.

However, in accordance with the present invention, a stop is provided which physically obstructs and terminates travel of the movable rod 36. In that regard, the upper end of the rod 36 includes an abutment 80. Mounted on the front end of the upper arm 22 is a stop assembly 82 comprising a micrometer 84 which includes a screw shaft 86 positioned beneath the abutment member 80. A manual actuating knob 88 is attached to the opposite (lower) end of the screw shaft which, when rotated, moves the upper end of the shaft 86 up or down. That end of the shaft 86 defines a stop for the abutment 80. The stop can be positioned to terminate gravitational movement of the rod, and thereby terminate the forging action. Since the movement of the rod during forging is relatively slow, and uniform from one operation to the next, it is possible to accurately terminate the pulse just before the forging has been completed, i.e., just prior to contact of the abutment 80 with the stop 86. Since the workpieces will remain soft for an instant after termination of the pulse, the rod 36 will continue to move downwardly until contacting the stop. Hence, a highly dimensionally precise weld depth is achieved in the absence of spitting.

As noted earlier herein, the provision of a stop in electrical resistance welders has, in practice, been avoided until now, because a termination of the forging action prior to termination of the electrical pulse virtually assures that the workpiece will overheat and spit. Hence, manufacturers of electric resistance welders have deliberately shunned the use of measures such as stops which would obstruct the forging action.

Not only does the stop of the present invention enable a precisely dimensioned part to be formed, but the fact that the stop is able to engage the abutment and define a base (neutral) position relative thereto with the electrode disposed in contact with the workpiece, ensures that dimensional variances from one workpiece to the next will be compensated for. That is, if a workpiece positioned to be welded is thinner than a previously welded workpiece, there will be no change in the distance of the weld because the stop is moved into engagement with, and backed off from, the abutment only after the electrode has been brought into engagement with the workpiece.

Furthermore, since the stop is infinitely adjustable (i.e., is adjustable to any spacing from the abutment), a precise positioning of the stop is possible.

If desired, the micrometer 82 could be mounted on the rod 36 and arranged to contact a stationary abutment disposed on the frame, in lieu of the arrangement depicted in the drawing.

IN OPERATION, the workpieces 62, 76 are mounted in the upper and lower electrodes. For example, the wire 62 is mounted in the upper electrode 60, and the ball 76 mounted in the lower electrode 78, the exposed upper end 90 of the wire being aligned with the ball 76. The latch 40 is released to permit the rod 36 to be manually lowered until the end 90 of the wire touches and is supported by the periphery of the ball 76. The shaft 86 of the micrometer is then raised and brought into engagement with the abutment member 80 and is then backed away by a distance equaling the desired amount of penetration of the ball into the wire (i.e., the desired amount of forging). Then, an electric pulse is delivered through the electrodes 60, 78, which pulse also passes through the wire 62 and ball 76 to produce a softening thereof. (In some welders such a pulse lasts on the order of only 1 to 3 miliseconds.). The pulse is delivered by a conventional power supply 100 such as a Uniteck Model No. 60. At the initiation of the softening action (which occurs virtually instantaneously with the initiation of the pulse) the rod 36 and upper electrode 60 descend with an acceleration equal to the acceleration of gravity, i.e., 32.2 ft/sec.$^2$. Immediately prior to the occurrence of contact between the abutment 80 and the upper end of the shaft 86 of the micrometer, the pulse terminates whereupon the workpieces 62, 76 immediately begin to harden. Before the workpieces are able to harden sufficiently to terminate movement of the upper electrode 60, the upper electrode descends sufficiently to complete the weld and enable the abutment 80 to contact the micrometer shaft 86 and thus terminate forging action. Hence, a dimensionally precise weld is achieved.

As explained earlier, due to the acceleration of the upper electrode at a constant, slow rate (as compared with conventional variable, rapid accelerations produced by power-driven electrodes), the duration of the forging action is longer, and is also constant from one operation to the next. Due to the extended duration of the forging action, the pulse will be able to terminate just prior to the end of the forging action, whereby the workpieces will not overheat and spit as would occur if the forging action terminated prior to the end of the electric pulse. Such success could not be achieved by conventional power driven electrodes because of the rapid and variable acceleration of the movable electrode. Furthermore, even though the rate of acceleration of the movable electrode corresponds to gravitational acceleration and is independent of the weight of the rod 36, and the components carried thereby, that weight is applied against the workpieces and is sufficient to achieve a proper collapsing of the workpieces, as well as to press the workpieces together sufficiently firmly to minimize the electrical resistance of the workpieces.

Furthermore, since the stop is moved into contact with, and backed-off from, the abutment after the electrode has been brought into contact with the workpiece, dimensional variations from one workpiece to the next will be automatically compensated for.

The present invention is particularly effective in the welding of very small workpieces, especially the welding of a ball to a wire wherein the diameter of the ball or wire does not exceed 0.08 inches, and wherein a very small dimensional tolerance range exists.

Although the present invention has been described in connection with preferred embodiments thereof, it will be appreciated by those skilled in the art that modifications, substitutions, additions and deletions not specifically described may be made without departing from the spirit and scope of the invention as defined in the appended claims.

What is claimed is:

1. An electric resistance welding apparatus for achieving a preceision-depth weld comprising:
   frame means;
   a gravitationally movable arm mounted to said frame means for upward and gravitational downward movement relative thereto;
   a movable electrode carried at an end of said movable arm;
   a stationary electrode spaced opposite said movable electrode to accommodate a plurality of workpieces therebetween, with said movable electrode resting against the workpieces and gravitationally biased toward said stationary electrode;

means for conducting an electric pulse through said electrodes and workpieces for heating and softening the workpieces to enable workpieces to be collapsed toward one another under the weight of said movable electrode whereupon said movable electrode descends under the influence of gravity toward said stationary electrode at the acceleration of gravity; and adjustable stop means on one of said arm and frame means and arranged to be engaged by an abutment on the other of said arm and frame means for terminating travel of said arm once the electric pulse has terminated, to prevent movement of said movable electrode beyond a desired welding distance and thereby produce a weld of precision depth.

2. An electric resistance welding apparatus according to claim 1, wherein said stop means comprises an adjustable micrometer.

3. An electric resistance welding apparatus according to claim 1, wherein said stop means is carried by said frame means and said abutment is carried by said arm.

4. An electric resistance welding apparatus according to claim 1, wherein said frame means comprises vertical bearing means, said arm comprising a circular cylindrical bar vertically slidably mounted in said bearing means.

5. An electric resistance welding apparatus according to claim 1, including means for releasably holding said arm in a raised position to enable new workpieces to be mounted in said electrodes.

6. An electric resistance welding apparatus according to claim 5, wherein said holding means comprises a spring-biased manually actuable latch.

7. A method of resistance welding a pair of workpieces together, said method comprising the steps of:
 (A) providing a movable arm disposed movably in a frame means,
 (B) mounting one of said workpieces in a movable electrode carried by said movable arm and mounting the other of said workpieces in a stationary electrode carried by said frame means opposite said movable electrode,
 (C) moving said movable electrode to bring said one workpiece into engagement with said other workpiece so as to be supported by said other workpiece,
 (D) adjusting an adjustable stop carried by one of said arm and frame means until said stop abuts an abutment carried by the other of said arm and frame means,
 (E) backing-off said stop from said abutment by a distance equal to the desired welding distance,
 (F) conducting an electrical pulse through said electrodes and workpieces to heat and soften said workpieces, whereupon said movable electrode moves gravitationally toward said stationary electrode to collapse said workpieces until said stop contacts said abutment once the electric pulse has terminated and physically obstructs said movable electrode from further movement beyond said desired welding distance.

* * * * *